Patented Sept. 22, 1931

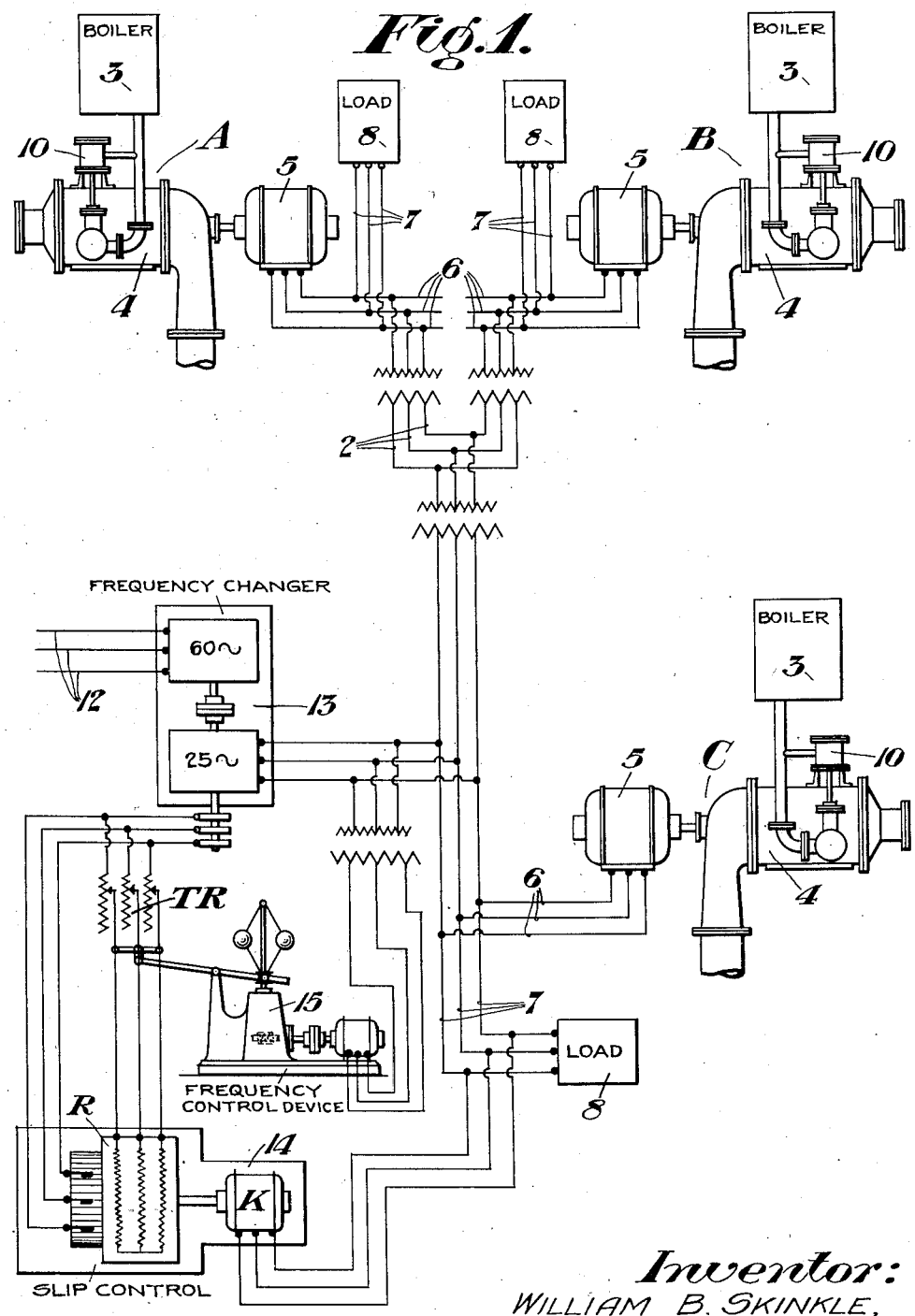

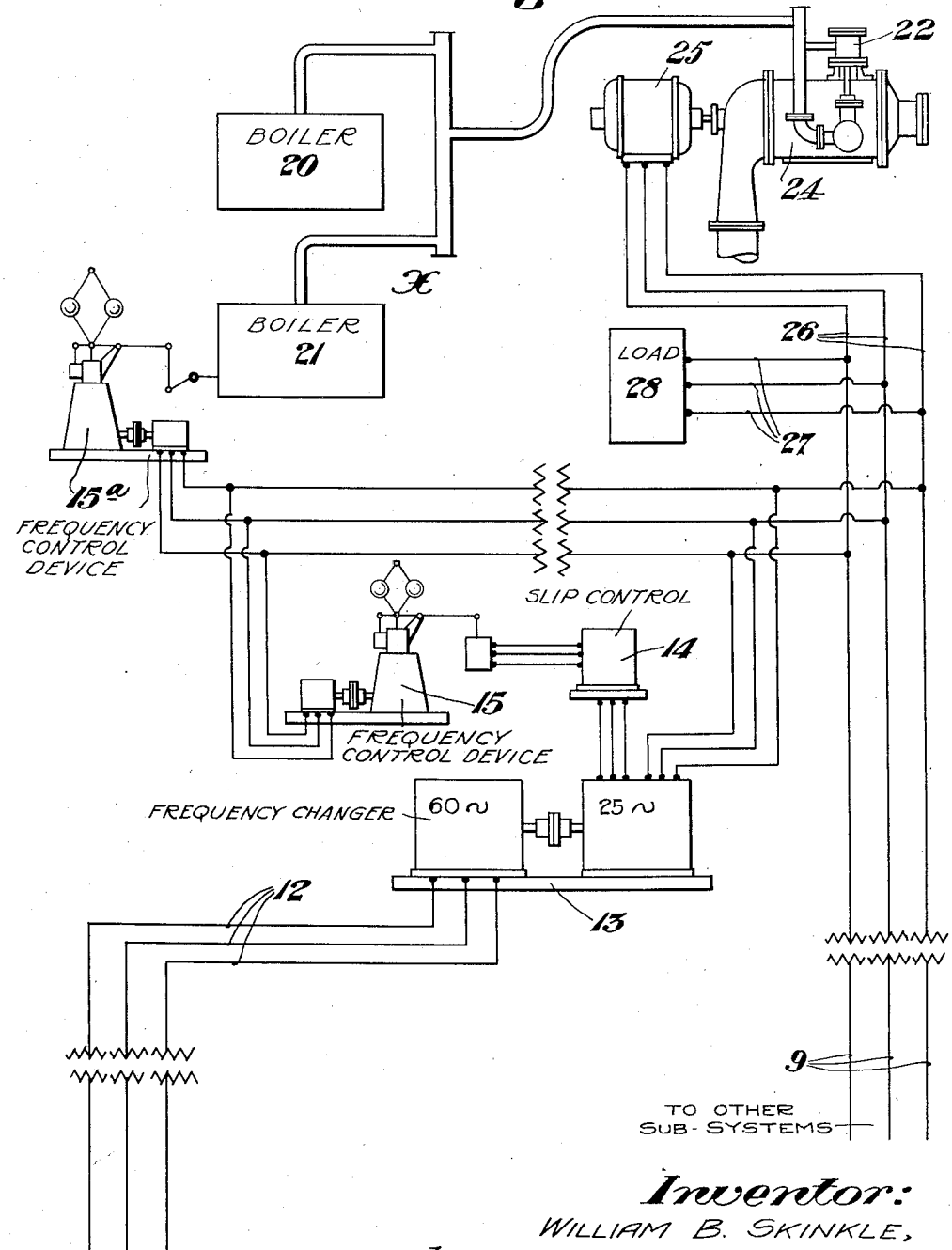

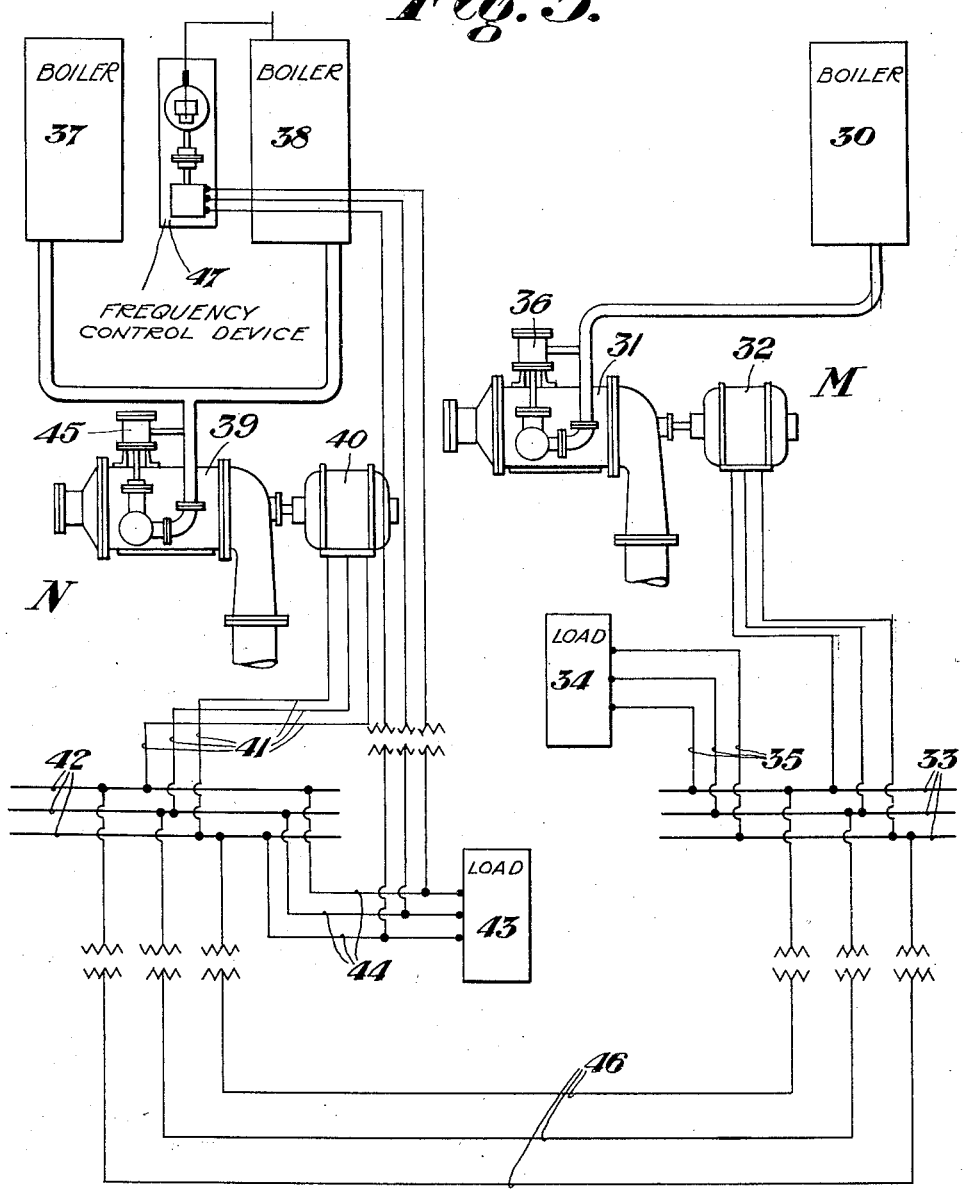

1,824,692

UNITED STATES PATENT OFFICE

WILLIAM B. SKINKLE, OF CORAOPOLIS, PENNSYLVANIA

ELECTRIC POWER SYSTEM

Application filed December 6, 1929. Serial No. 412,225.

This invention relates to electric power systems and, while not limited thereto, relates more particularly to means for controlling load distribution on electric power systems such as the systems of manufacturing corporations which generate electric energy in whole or part from by-product or non-storable fuel, which fuel is incidental to their regular manufacturing process.

By-product fuels may be described as blast furnace gas, coke oven gas, coke braize or waste heat from metallurgical or other industrial furnaces or processes.

The object of the control system is to distribute the electric load among several generators or sub-systems operated by the manufacturing corporation, which generators or sub-systems may be located at great distances from each other, in such a manner that the maximum use may be made of the by-product fuel resources, and particularly those fuels which cannot be economically stored and held in reserve for use at such times as the electric load is greater than can be supplied by the quantities of by-product fuel immediately or momentarily available.

One of the difficulties encountered in attempts to make efficient use of by-product or non-storable fuels for the generation of electric energy is the difficulty of synchronizing the load and the supply of the by-product fuel, which fuel when in the form of large quantities of low heat value gas or in the form of high temperature products of combustion from metallurgical furnaces is particularly difficult to store or hold in reserve even for short periods of time. It frequently happens that at moments of large demand on the electric system there is insufficient by-product fuel to meet the large demand for electric energy and conversely at other times when a large supply of by-product fuel is available, the electric load may be small and, therefore, a very large quantity of by-product fuel would have to be released and dissipated into the surrounding atmosphere.

The present invention has the following objects and advantages:

1. The regulation of the load on each sub-system so that the energy produced will increase or decrease with variations in the supply of by-product or non-storable fuel available at that sub-system.

2. The distribution of the load among the several sub-systems of the general system so that the quantity of electric energy produced in each of the several sub-systems will change in accordance with the variations in the supply of fuel available at each of the several other systems and whereby the lack of energy in any one of the several sub-systems will be supplied by energy from the several other sub-systems if fuel is available.

3. The provision of means operable by the frequency of the sub-systems whereby the flow of power from an external or outside system or source such as a public utility system, which is electrically connected to the combined sub-systems, may be controlled in such a manner that at such times as the electric load on the sub-systems exceeds that which can be generated from the by-product or non-storable fuel, an additional quantity of electric energy sufficient to meet the immediate demand will be supplied from such outside source and at such times as the electric load on the sub-systems is less than that generated by the sub-systems, the excess energy will be fed into said outside source. The outside source of energy is generated at least in part by a storable fuel such as coal, and, therefore, any excess energy fed into said system will permit the saving of storable fuel by said outside system.

In the drawings:

Figure 1 is a diagrammatic plan of a plurality of electric sub-generating systems and an outside source of supply all connected and arranged so as to operate in accordance with this invention.

Figure 2 is a diagrammatic plan showing a single sub-system connected with an outside source of power whereby storable fuel may be used for generating part of the electric energy of the sub-system.

Figure 3 is a diagrammatic plan of two sub-systems arranged and connected to operate in accordance with this invention.

Referring more particularly to the apparatus of Figure 1 three sub-systems or stations A, B and C are shown connected in parallel by transmission lines 2. The sub-systems or stations A, B and C represent the generating stations of a manufacturing plant such as provided for separate mills.

Each of the sub-systems A, B and C comprise a boiler 3 fired by by-product or non-storable fuel and furnishing steam to a turbine 4 for operating a generator 5 which delivers its electric energy to bus-bars 6. The energy is delivered from the bus-bars 6 through lines 7 to the mill providing a varying load indicated by the rectangle 8.

A steam pressure governor 10 is provided on each of the turbines 4 and connected with the boiler or boilers furnishing steam thereto so as to automatically step up the turbines and consequently the generator output is also stepped up as the steam pressure in the boiler increases, whereby the generator output will be increased or decreased in direct proportion to the fuel consumed. The complete supply of non-storable fuel is consumed at all times regardless of the load requirements on the individual sub-stations.

The parallel connected sub-systems or stations A, B and C are inter-connected with an outside source of electric energy such as a public utility system represented by the power lines 12 so as to draw energy from the outside system when the load on the sub-systems is more than they are generating or to provide an outlet for excess energy when the load on said sub-systems is less than the energy being generated.

The sub-systems are adapted to operate at a normal frequency of 25 cycles and the outside or public utility system is adapted to operate at 60 cycles; therefore a frequency changer 13 is connected between the parallel connected sub-systems A, B and C and the outside system 12. It will be understood that this invention is not limited to use with the above mentioned cycles but may be used with any cycle system desired.

A slip control apparatus 14 of any well known make is provided for controlling the direction of energy flow through the frequency changer 13.

The slip control apparatus 14 shown in Figure 1 is of the "Sherbius" type and comprises a separate high speed motor generator set consisting of a regulating machine R adapted to convert the slip energy into mechanical power on its shaft and a squirrel cage induction motor K which "pumps" this power back on the line acting as a generator. The set runs at practically constant speed and the frequency changer 13 is adjusted by regulating the taps on the field control transformer TR. The taps on the field control transformer TR in the present embodiment of the apparatus are adapted to be automatically adjusted by a frequency load or ratio control apparatus 15 which is operated by the 25 frequency electric current of the parallel connected sub-systems A, B and C.

The pressure governor 10 is a standard commercial control device adapted to control the delivery of steam supplied by boilers that are fired by surplus heat or non-storable fuel. The pressure governor and its associated mechanism operate the controlling valves of the turbine according to the pressure and pressure change of the steam as generated, increasing the opening of the controlling valves as the pressure (and available quantity) of steam increases and decreasing the opening of the valves when the available quantity and pressure diminishes, so as to increase or decrease the delivery of steam to the turbine as generated by the boiler but governing it to maintain a substantially constant pressure of delivery.

The frequency load control apparatus or frequency device 15 is also a standard piece of commercial equipment and comprises a synchronous alternating current motor that is connected to the parallel connected sub-systems A, B and C. The motor operates associated mechanism including a control lever in response to the changes of frequency in the parallel sub-systems so as to operate the "Sherbius" slip control and thereby control the frequency changer 13 in direct response to the changes in frequency of the parallel sub-systems.

The operation of the system above described is as follows:

When all of the sub-systems are operating and in balance, and a fuel drop occurs at any one of the sub-systems A, B or C, the electric energy will drop in that particular sub-system in proportion to the drop in fuel, and this sub-system will then draw from and cause an excess load on the other sub-systems which are in parallel therewith. If the other systems cannot respond to this increased load demand, the frequency of the parallel sub-systems will drop, thereby causing the frequency load device 15 to operate the slip control 14 on the frequency changer 13 to permit energy from the outside system to flow into the parallel connected sub-systems to make up for the excess load caused by the fuel drop.

If one or more of the sub-systems A, B or C were generating an excess of energy due to an excess of fuel being available while the remaining sub-systems were in balance, this excess would be fed into the balanced sub-systems thus reducing their loads and causing an increased steam pressure in each of said sub-systems whereby all of said systems would be caused to step up and thus increase the frequency in the parallel subsystems. This increased frequency would thus cause the frequency device or load control 15 to operate the slip control 14 on the frequency changer 13 to permit the excess energy to flow out into the outside system.

Again assuming that one or more of the sub-systems A, B or C were generating an excess of energy while one or more of the others were generating less energy than its load required, in this case the overloaded system or systems would draw upon the excess of the other sub-systems in an attempt to balance the parallel sub-systems. However, if the excess energy of the other sub-systems were less than required the frequency of the parallel sub-systems would drop and cause a flow of energy from the outside system to make up the deficit. If the excess energy is more than that required by the overloaded sub-system then the excess energy will cause a rise in frequency of the parallel sub-systems so as to cause a flow of energy into the outside system.

The whole method broadly consists in causing a plurality of operating systems to utilize or consume all of the non-storable fuel available at all times causing said sub-systems to assist each other to maintain their load requirements, and finally providing an automatic "valve" connection with an outside system operable by storable fuel which will permit excess energy to flow from said sub-systems into said outside system or cause a flow of energy from said outside system into said sub-systems to make up a deficit in said sub-systems.

The frequency changer 13 and slip control 14 shown in Figure 2 are the same as that shown in Figure 1 and, therefore, the slip control is not shown in detail since it only serves to complicate the illustration. The slip control itself forms no part of my invention since it is standard commercial apparatus.

In Figure 2 a single sub-system X is shown connected with an outside system. The sub-system X is composed of two boilers 20 and 21 fired with by-product or non-storable fuel and coal or like storable fuel, respectively. The boilers supply steam to a turbine 24 to operate a generator 25 which delivers its energy to bus-bars 26. A steam pressure governor 22 is provided for controlling the turbine 24. The energy is delivered from the bus-bars 26 through the lines 27 to a mill providing a varying load indicated at 28.

The bus-bars are also connected to transmission lines 9.

The sub-system X may be operated alone or may be connected in parallel with a plurality of other non-storable fuel operated sub-systems, as desired, and in either case will be connected with an outside supply system as described for Figure 1 with its frequency changer and automatic control.

A second frequency control apparatus 15a is connected to the transmission lines 9 and is adjusted to operate on or at a lesser frequency variation than the frequency control apparatus 15. This second apparatus 15a is adapted to control the firing of the storable fuel boiler 21 so that this boiler will be used to balance the energy produced and the load prior to drawing from or feeding into the outside system.

In operating the apparatus of Figure 2, the sub-system X will be operated at full capacity of the steam generated by non-storable fuel in the boiler 20, while the boiler 21 will be fired only sufficiently to support combustion. If the load on the sub-system X increases beyond that energy produced by the non-storable fuel, due to a change in conditions of this sub-system or any other sub-system to which it is connected in parallel, the frequency of the energy will drop thereby causing the frequency apparatus 15a to operate and increase the storable fuel combustion of the boiler 21 in an attempt to supply sufficient steam to boost up the operation of the generator of sub-system X so as to supply the energy needed for the excess load. After the boiler 21 has reached its maximum production, if the load is still greater than the energy produced by the sub-systems, the frequency apparatus 15 will operate to control the frequency changer and supply the needed energy from the outside supply system.

If the reverse condition exists, that is, if the load should be diminished on the sub-system X or the non-storable fuel supply should increase so as to provide sufficient steam to produce more energy than consumed by the load, the frequency apparatus 15a would first reduce the consumption of storable fuel by the boiler 21 to a minimum, and then if there were still an excess of energy being produced the frequency apparatus 15 would operate to control the frequency changer 13 so as to cause it to feed the excess energy into the outside system.

The result obtained by the apparatus of Figure 2 is the same as that obtained by the preferred apparatus of Figure 1 except that the lack or excess of energy is first adjusted by means of the storable fuel fired boiler 21 and the outside system is only called upon to take care of extreme variations in the energy supply.

In Figure 3 two generating systems M and N are shown connected in parallel and adapted to utilize non-storable fuel for generating energy and storable fuel for supplying energy when excess load is applied to the systems.

The system M comprises a by-product fuel boiler 30 which supplies steam to a turbine 31 connected to and operating a generator 32 which generates electric energy and supplies it to the bus-bars 33. The mill or other load indicated at 34 is taken off of the bus-bars 33 through lines 35. A steam pressure governor 36 is connected to the boiler 30 and is adapted to control the turbine 31 so as to utilize all of the steam produced and, therefore, cause a generation of electric energy in proportion to the supply of by-product or non-storable fuel available.

The system N comprises a by-product or non-storable fuel boiler 37 and a coal or storable fuel boiler 38, both of which are connected to and furnish steam to a turbine 39. The turbine 39 is connected to and operates a generator 40 which delivers its generated energy through lines 41 to bus-bars 42. The mill or other load indicated at 43 is taken from the bus-bars 42 through lines 44.

A steam pressure governor 45 is connected to the boilers 37 and 38 and is adapted to control the turbine 39 so as to utilize all the steam produced and, therefore, to cause a generation of electric energy in direct proportion to the steam produced by both the non-storable and storable fuels.

The bus-bars 33 of the system M and the bus-bars 42 of the system N are connected in parallel by transmission lines 46 so that if either system is generating an excess of current it will deliver its excess to the other system and if either system is overloaded or generating less energy than its load requirements, it will draw on the other system.

A frequency control device 47 is connected to the lines 44 and is adapted to control the feed of storable fuel to the boiler 38.

In operating the apparatus of Figure 3 with the systems M and N the boilers 30 and 37 will consume all of the by-product or non-storable fuel available and will normally furnish steam sufficient to generate the energy required by the normal loads on the systems. The boiler 38 will be normally burning only sufficient coal or other storable fuel to support combustion.

Assuming that system N is in balanced condition and that the fuel supply to system M drops, the energy will also drop in proportion and, therefore, the system M will draw on the system N due to the parallel connection of said systems, thereby reducing the frequency in the system N and causing the frequency device 47 to operate to feed storable fuel to the boiler 38, and thereby increase the steam supply to the turbine 39, which in turn will operate the generator 40 to increase the output of energy in the system N until the frequency is restored to normal. When the frequency is restored to normal either by a reduction in load on the system M or by a greater supply of non-storable fuel, the frequency device 47 will automatically reduce the amount of storable fuel to the boiler 38.

If the non-storable fuel supply to the system N should fall below that necessary to generate the amount of steam necessary to cause the generator 40 to produce sufficient energy to carry the normal load on the system N or, if such load should be increased, the frequency will drop and as a result the frequency device 47 will operate to increase the feed of storable fuel as described above.

Again, if the supply of non-storable fuel to either systems M or N should increase while the other is short and storable fuel is being fired in the boiler 38, the frequency of the systems will rise thereby causing the frequency device 47 to operate and reduce the feed of storable fuel.

In short, this apparatus uses non-storable fuel for producing the normal consumption of electric energy in two or more parallel systems and automatically cuts in storable fuel-made electric energy only when the supply of non-storable fuel falls below that required or when the load on the systems is raised beyond normal.

While I have described certain specific arrangements of mechanism and system hook-ups for carrying out the novel features of this invention together with certain specific applications of the invention, it will be understood that I do not wish to be limited thereto since various arrangements of apparatus other than those described and other applications of the invention may be made without departing from the scope of my invention, as defined in the appended claims.

I claim:

1. In an electric power system, a plurality of alternating current sub-generating systems having independent load requirements, said sub-generating systems being connected in parallel, and an alternating current electric power supply system, said parallel connected sub-generating systems and said supply system being interconnected through a frequency changer, means for automatically controlling each of said sub-generating systems so that they will each generate at maximum capacity for the fuel provided at all times regardless of the load on each system so that if any of said sub-generating systems are generating less energy than its load requirements said system will absorb energy from the other sub-generating systems, a control device for controlling the direction of energy flow through said frequency changer, and a frequency ratio control means operable by said parallel connected sub-generating systems for automatically operating said control device responsive to the frequency of said parallel connected sub-generating systems, whereby energy will flow from said sub-generating systems through said frequency changer into said power supply system when the frequency on said sub-generating systems rises above a predetermined limit and energy will flow from said power supply system through said frequency changer into said sub-generating systems when the frequency on said sub-generating systems falls below a predetermined limit.

2. In an electric power system, a plurality of alternating current sub-generating systems operable by non-storable fuel, said sub-generating systems having independent load requirements and being connected in parallel, and an alternating current electric power supply system preferably operable by a storable power medium, said parallel connected sub-generating systems and said supply system being interconnected through a frequency changer, means for automatically controlling each of said sub-generating systems so that they will each generate at maximum capacity for the fuel provided at all times regardless of the load on each system so that if any of said sub-generating systems are generating less energy than its load requirements said system will absorb energy from the other sub-generating systems, a slip control device for controlling the direction of energy flow through said frequency changer, and a frequency ratio control means operable by said parallel connected sub-generating systems for automatically operating said control device responsive to the frequency of said parallel connected sub-generating systems whereby energy will flow from said sub-generating systems through said frequency changer into said power supply system when the frequency on said sub-generating systems rises above a predetermined limit and energy will flow from said power supply system through said frequency changer into said sub-generating systems when the frequency on said sub-generating systems falls below a predetermined limit.

In testimony whereof, I have hereunto set my hand.

WILLIAM B. SKINKLE.